US009801005B2

(12) United States Patent
Su et al.

(10) Patent No.: US 9,801,005 B2
(45) Date of Patent: Oct. 24, 2017

(54) METHOD OF PERIOD ALLOCATION FOR MEDIUM AND WIRELESS COMMUNICATION SYSTEM THEREOF

(71) Applicant: MEDIATEK INC., Hsin-Chu (TW)

(72) Inventors: Shih-Chang Su, Hsinchu County (TW); Ching-Hwa Yu, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 76 days.

(21) Appl. No.: 14/742,667

(22) Filed: Jun. 17, 2015

(65) Prior Publication Data

US 2015/0373716 A1  Dec. 24, 2015

Related U.S. Application Data

(60) Provisional application No. 62/014,122, filed on Jun. 19, 2014.

(51) Int. Cl.
| H04W 4/00 | (2009.01) |
| H04W 74/08 | (2009.01) |
| H04W 84/12 | (2009.01) |

(52) U.S. Cl.
CPC ....... *H04W 4/008* (2013.01); *H04W 74/0816* (2013.01); *H04W 84/12* (2013.01)

(58) Field of Classification Search
CPC . H04W 72/0453; H04W 4/008; H04W 84/12; H04W 74/0816; H04L 5/0055
USPC ........................................................ 370/338
See application file for complete search history.

(56) References Cited

U.S. PATENT DOCUMENTS

| 2009/0154372 | A1* | 6/2009 | Wang | H04W 74/0841 370/253 |
| 2010/0182986 | A1* | 7/2010 | Okuike | H04W 56/00 370/338 |
| 2010/0329202 | A1* | 12/2010 | Sun | H04W 72/1215 370/329 |
| 2011/0038332 | A1 | 2/2011 | Liu | |
| 2012/0281533 | A1 | 11/2012 | Xhafa | |
| 2013/0155931 | A1 | 6/2013 | Prajapati | |
| 2013/0303214 | A1 | 11/2013 | Ahmadi | |
| 2014/0010211 | A1* | 1/2014 | Asterjadhi | H04W 72/0446 370/336 |
| 2015/0063251 | A1* | 3/2015 | Asterjadhi | H04W 74/04 370/329 |
| 2015/0312279 | A1* | 10/2015 | Wentink | H04W 74/0816 370/329 |
| 2015/0319784 | A1* | 11/2015 | Bhushan | H04W 74/0816 370/329 |

FOREIGN PATENT DOCUMENTS

TW        201234823 A1     8/2012

* cited by examiner

*Primary Examiner* — Faisal Choudhury
(74) *Attorney, Agent, or Firm* — Winston Hsu

(57) ABSTRACT

A method of period allocation for a medium to be utilized by a first wireless communication device comprising at least one wireless local area network (WLAN) module includes while the first wireless communication device occupies the medium, detecting a termination period of a Network Allocation Vector (NAV) of the medium; and the first wireless communication device extending the termination period of the NAV of the medium if the termination period of the NAV is earlier than an expected period.

10 Claims, 9 Drawing Sheets

METHOD OF PERIOD ALLOCATION FOR MEDIUM AND WIRELESS COMMUNICATION SYSTEM THEREOF

CROSS REFERENCE TO RELATED APPLICATIONS

This application claims the benefit of U.S. Provisional Application No. 62/014,122, filed on Jun. 19, 2014 and entitled "Wi-Fi channel reservation by extending period allocation", the content of which is incorporated herein.

BACKGROUND

The present invention relates to a method of medium access period allocation for a shared medium networks, and more particularly, to a method of medium access period allocation and a wireless communication system accessing overlapped, partially overlapped or non-overlapped radio frequencies by at least two wireless communication devices.

When a plurality of wireless communication modules, e.g. wireless local area network (WLAN), Bluetooth and Long Term Evolution (LTE) systems, operates in a time-division multiplexing manner, a Network Allocation Vector (NAV) as a virtual carrier sense mechanism is utilized by the WLAN module(s) to reserve a period of time, so as to prevent contentions from its counterparty of WLAN modules. The NAV could be triggered by a Clear to Send to Self (CTS2Self) signal, and comprises timing information to indicate duration that medium will be considered as busy in a WLAN, such that the wireless communication module may consider this duration information of the NAV as a period for its transmission or reception.

However, if there are other WLAN devices which have already reserved the medium in other manner or pattern, duration of medium reservation may not be adequate for the other wireless communication modules to finish its transmission or reception. Please refer to FIG. 1, which illustrates a conventionally schematic diagram of CTS2Self transmissions of WLAN communication devices. As shown in FIG. 1, there are a first wireless communication device utilizing the Bluetooth module and a WLAN module and a second wireless communication device utilizing the WLAN module. The WLAN module and the Bluetooth module of the first wireless communication device operate in a time-division manner. In a precluded time-slotting pattern, the WLAN module of the first wireless communication device operates for a WLAN traffic in a period t1 after the Bluetooth module has completed a Bluetooth traffic. After finishing the WLAN traffic and before ending the precluded time slot (i.e. the period t1), if the second wireless communication device transmit a CTS2Self signal to reserve the medium in another period t2, the first wireless communication device is not able to reserve the medium for a period of time to stop the traffic from its counterparty and allocate this duration for the Bluetooth operation. It is because the NAV has already been reserved by the second wireless communication device in the period t2. Accordingly, the subsequent Bluetooth traffic of the Bluetooth module may potentially collide with another WLAN traffic being sent from the AP to the first wireless communication device. Thus, the first wireless communication device may fail to protect its WLAN traffic due to the consequence of inadequate duration allocation of the NAV from the second wireless communication device.

Therefore, it is essential to provide a resolution for medium reservation to wireless communication system to operate collaboratively in the scenario of coexistence of at least two wireless communication devices.

SUMMARY

Therefore, the primary objective of the present invention is to provide a method of period allocation and a wireless communication system for a medium where at least two wireless communication devices are operated with partial overlapping radio frequencies.

The present invention discloses of a method of period allocation for a medium in a first wireless communication device comprising at least one wireless local area network (WLAN) module. The method comprises while the first wireless communication device occupies the medium, detecting a termination period of a Network Allocation Vector (NAV) of the medium; and the first wireless communication device extending the termination period of the NAV of the medium if the termination period of the NAV is earlier than an expected period.

The present invention further discloses a wireless communication system, comprising a first wireless communication device comprising at least one wireless local area network (WLAN) module, at least the first wireless communication device utilizing a medium. The first wireless communication device comprises a processing unit, for executing a program code; and a data storage unit, for storing the program code representing a method of period allocation for the medium. The program code instructs the processing unit to execute the following steps: while the first wireless communication device occupies the medium, detecting a termination period of a Network Allocation Vector (NAV) of the medium; and the first wireless communication device extending the termination period of the NAV of the medium if the termination period of the NAV is earlier than an expected period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
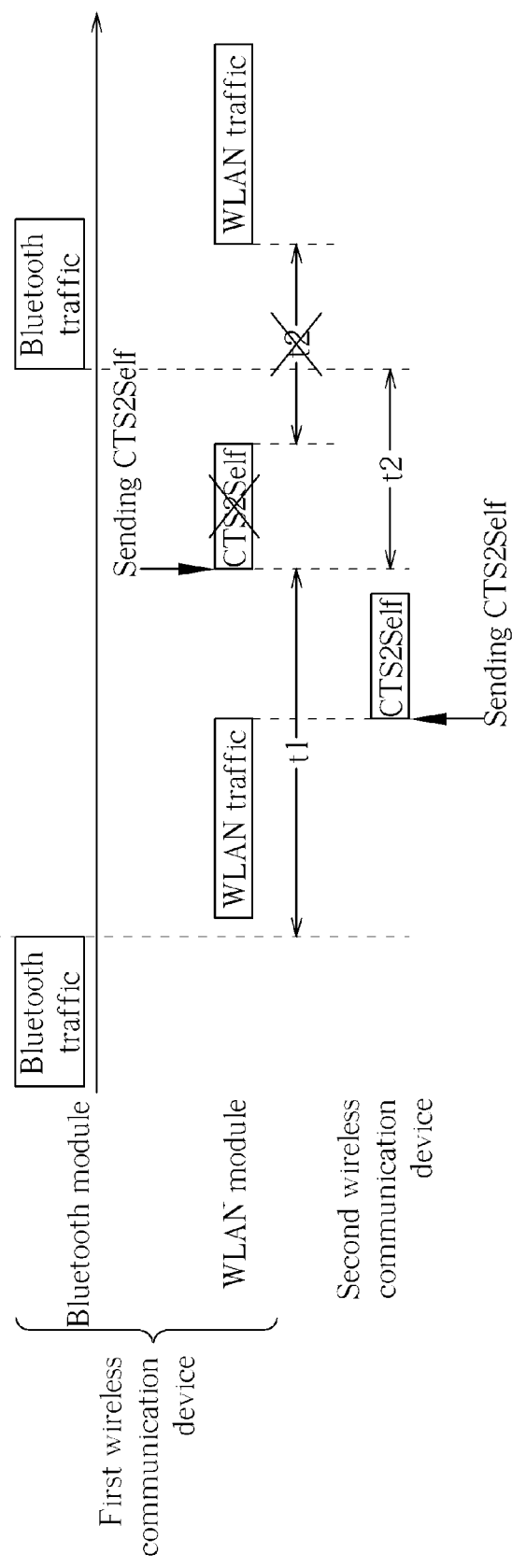
FIG. 1 illustrates a conventionally schematic diagram of coexistence of CTS2Self transmissions of WLAN communication devices.
Figure 2:
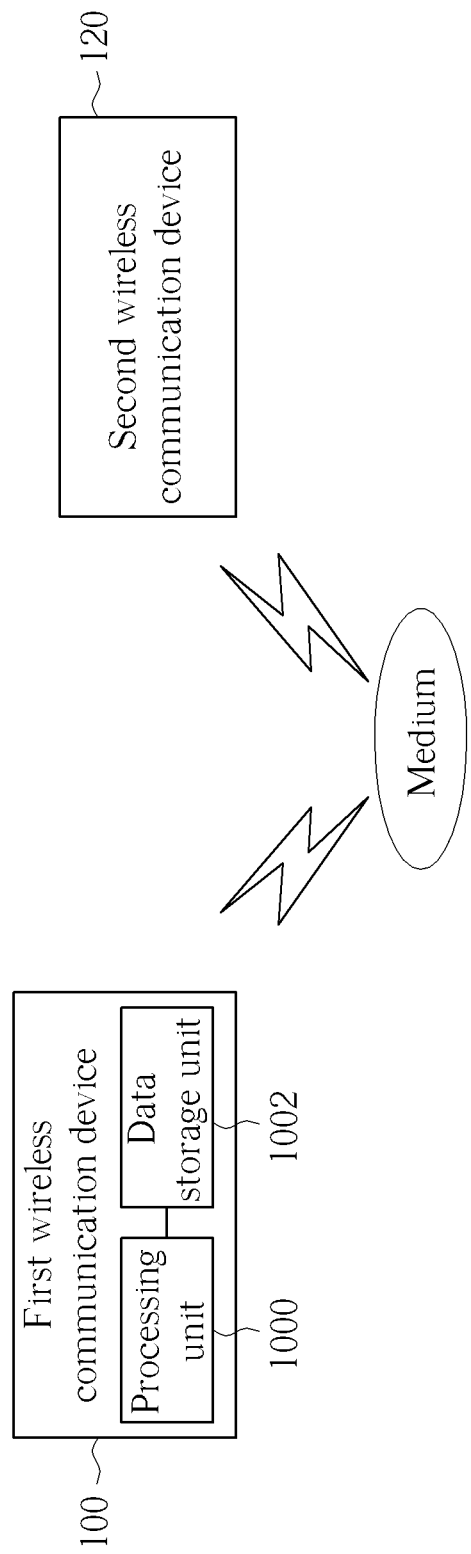
FIG. 2 illustrates a schematic diagram of coexistence of at least two wireless communication devices in a wireless communication system according to an embodiment of the invention.

Please refer to FIG. 2, which illustrates a schematic diagram of coexistence of at least two wireless communication devices in a wireless communication system according to an embodiment of the invention. As shown in FIG. 2, a first wireless communication device 100 and a second wireless communication device 120 are in a wireless communication system 10. In the embodiment of the invention, both the first wireless communication device 100 and the second wireless communication device 120 can access the medium. The first wireless communication device 100 comprises a processing unit 1000 and a data storage unit 1002. The data storage unit 1002 stores a program code for the processing unit 1000 to execute the program code. Accordingly, a method of period allocation for the medium is processed by the first wireless communication device 100 in the wireless communication system 10 when the first wireless communication device 100 attempts to reserve the media access time to send/receive packets or keep media silent purpose. Also, the second wireless communication device 120 of the embodiment of the invention may comprise another processing unit and data storage unit to simultaneously process another method of period allocation for the medium, such that, complying with the method of period allocation for the medium, the first wireless communication device 100 and the second wireless communication device 120 may sequentially access the medium without signal traffic collision.

In the following paragraphs, only the operation to be processed in the first wireless communication 100 is demonstrated, and the operation to be processed in the second wireless communication 120, being similar to the one of the first wireless communication 100, is neglected hereinafter for brevity.

Figure 3:
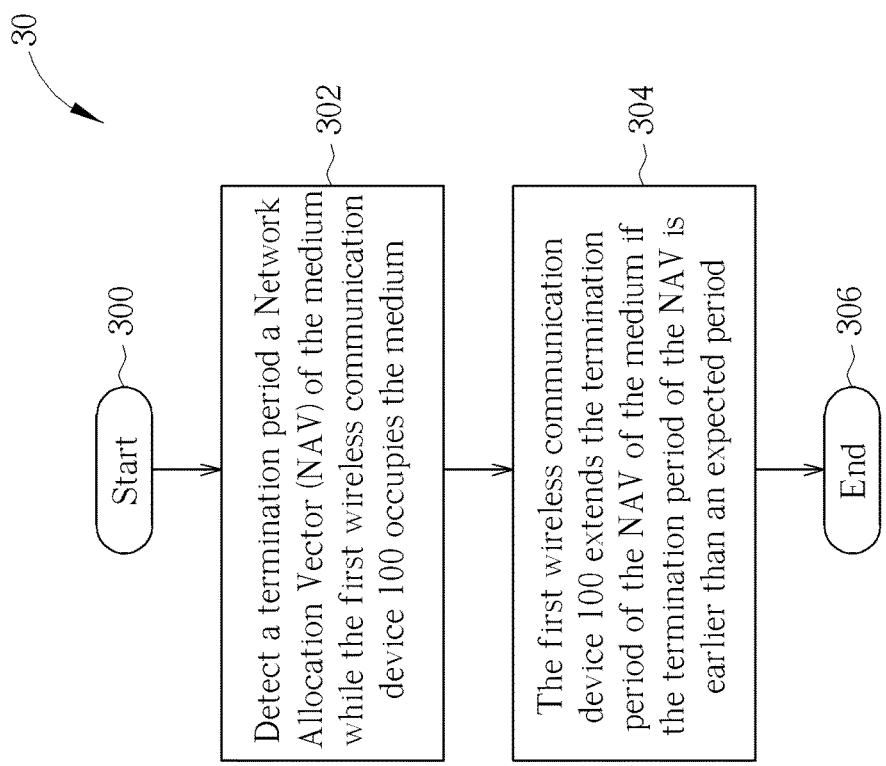
FIG. 3 illustrates a flowchart diagram for the first wireless communication device to process the method of period allocation of the medium according to an embodiment of the invention.

Please refer to FIG. 3, which illustrates a flowchart diagram for the first wireless communication device 100 to process the method of period allocation of the medium according to an embodiment of the invention. The method of period allocation for the medium can be summarized as a process 30 to be stored as the program code in the data storage unit 1002 of the first wireless communication device 100, and the process 30 of the invention comprises the following steps:

Step 300: Start.

Step 302: Detect a termination period a Network Allocation Vector (NAV) of the medium while the first wireless communication device 100 occupies the medium.

Step 304: The first wireless communication device 100 extends the termination period of the NAV of the medium if the termination period of the NAV is earlier than an expected period.

Step 306: End.

In the process 30 of the embodiment of the invention, the first wireless communication device 100 utilizes a WLAN module and at least another module, and the second wireless communication device 120 utilizes the WLAN module, which is not limiting the scope of the invention. In step 302, while the first wireless communication device 100 occupies the medium, the first wireless communication device 100 may detect the termination period of the NAV of the medium, e.g. checking a duration of the NAV. In step 304, if the termination period of the NAV is earlier than the expected period, the first wireless communication device 100 may adaptively extend the termination period of the NAV of the medium to the expected period.

In other words, while the original NAV of the medium is triggered by the second wireless communication device 120 and the first wireless communication device 100 notices that the current termination period of the NAV is earlier than the expected period, an extended period may be added to make the current termination period of the NAV align with the expected period. In the embodiment, the expected period can be a termination period of the occupation period of one module other than the WLAN of the first wireless communication device 100, or a termination period of the occupation period of another module of the second wireless communication device 120. Also, the occupation period of the one module other than the WLAN of the first wireless communication device 100 can be realized as a power-saved-mode duration of the first wireless communication, which is not limiting the scope of the invention. In detail, an additional CTS2Self signal, sent from the first wireless communication device 100, may be utilized to extend the current termination period of the NAV of the medium.

Figure 4:
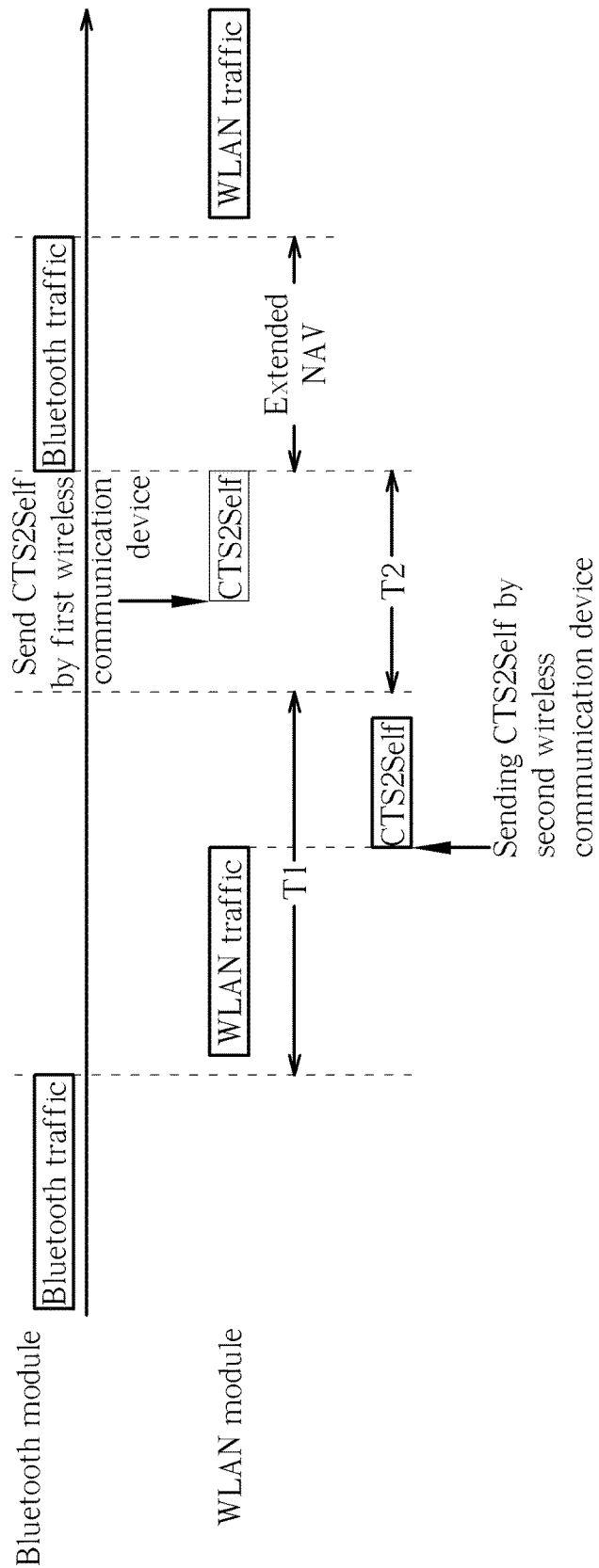
FIG. 4 illustrates a timing diagram for coexistence of a first wireless communication device and a second wireless communication device according to embodiment of the invention.

Please refer to FIG. 4, which illustrates a timing diagram for coexistence of the first wireless communication device 100 and the second wireless communication device 120 according to an embodiment of the invention. As shown in FIG. 4, the first wireless communication device 100, in a period T1, processes the WLAN traffic after the Bluetooth traffic. After ending the WLAN traffic in the period T1, the second wireless communication device 120 utilizing the WLAN module may send the CTS2Self signal to trigger the NAV in another period T2. Once the first wireless communication device 100 detects the expected period (e.g. the termination period of the occupation period of the Bluetooth module of the first wireless communication device 100) is latter than the current NAV triggered by the second wireless communication device 120, the first wireless communication device 100 sends another additional CTS2Self signal of in the period T2 to form another extended NAV after the ending of the current NAV, such that the Bluetooth module of the first wireless communication device 100 in the extended NAV may adequately process the Bluetooth traffic as scheduled. After completing the Bluetooth traffic, the medium may then be occupied by the WLAN module of the first wireless communication device 100 for processing the WLAN traffic, which may not collide with the Bluetooth traffic, as discussed in the prior art, with the advantage of the extended NAV.

Figure 5:
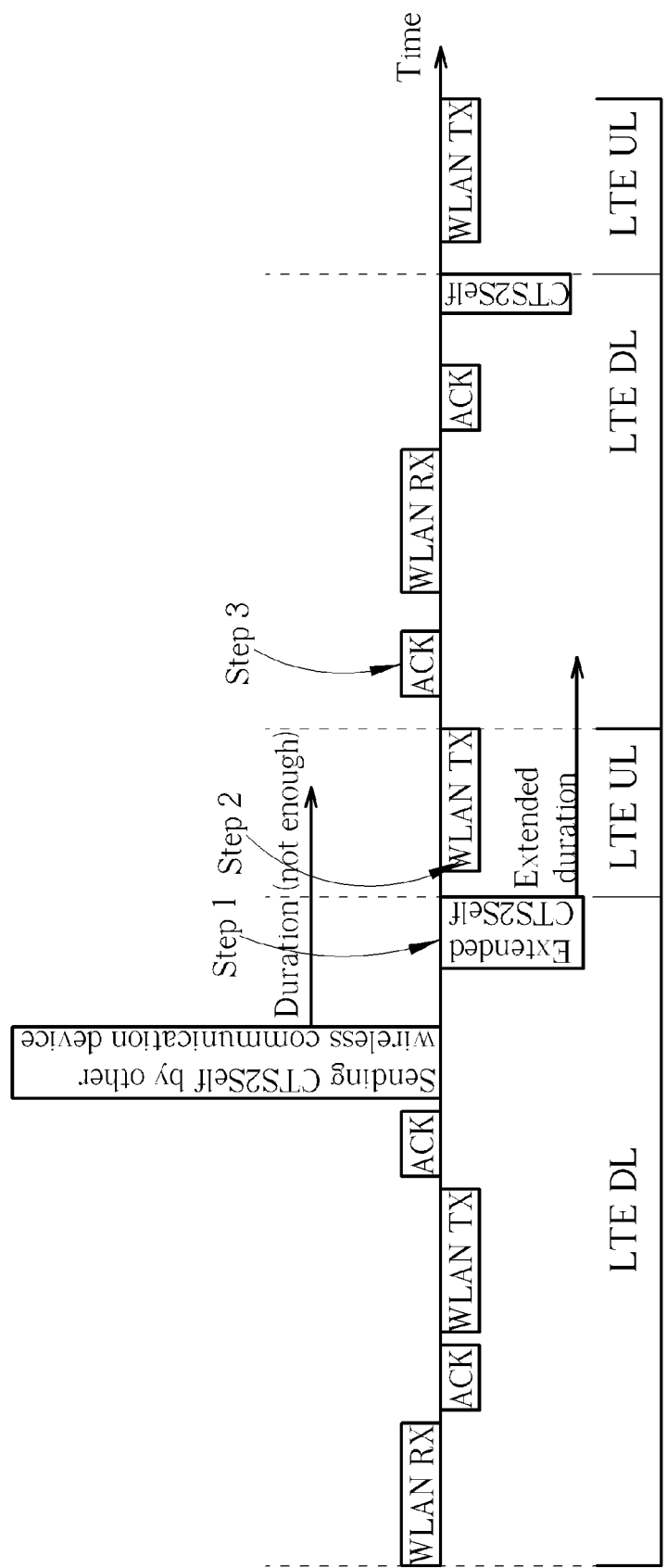
FIG. 5 illustrates a schematic diagram of another transmission signal alignment of the first wireless communication device according to an embodiment of the invention.

Please refer to FIG. 5, which illustrates a schematic diagram of another transmission signal alignment of the first wireless communication device according to an embodiment of the invention. As shown in FIG. 5, there are three steps for the first wireless communication device 100 having the WLAN module and a LTE module to be sequentially processed. Step 1, the WLAN module of the first wireless communication device 100 may send another CTS2Self signal after one existed CTS2Self signal is sent by another wireless communication device (e.g. the second wireless communication device 120 in FIG. 2) in an LTE downloading cycle and before an initiation of the LTE uploading cycle occurs. Step 2, after sending the CTS2Self signal, a transmitter of the LTE module finishes a data transmission before the extended termination period of the NAV of the medium, i.e. the LTE module may send all data in the extended LTE uploading cycle. Step 3, a corresponding receiver of the LTE module may receive an acknowledgement (ACK) signal in its occupation period, i.e. in the LTE downloading cycle.

In short, the first wireless communication device 100 may send the CTS2Self signal to extend the duration for its WLAN traffic in the LTE uploading cycle once the first wireless communication device 100 notices that the duration (i.e. the NAV) triggered by the other wireless communication device is not long enough to finish its data transmission. After the data transmission of the transmitter of the LTE module, the ACK signal is correspondingly received by the receiver of the LTE module in the LTE downloading cycle, which may contribute the period allocation of the medium in the scenario of coexistence of at least two wireless communication devices having partial overlapping radio frequencies without signal traffic collision.

Figure 6A:
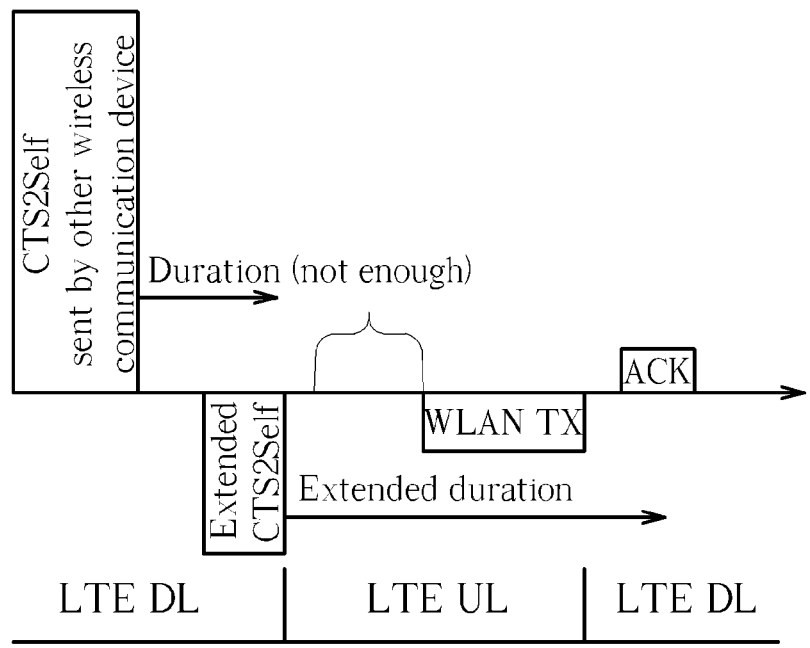
FIG. 6A to FIG. 7C illustrate schematic diagrams of how to adjust a transmission period in an extended NAV according to embodiment of the invention.
Figure 6B:
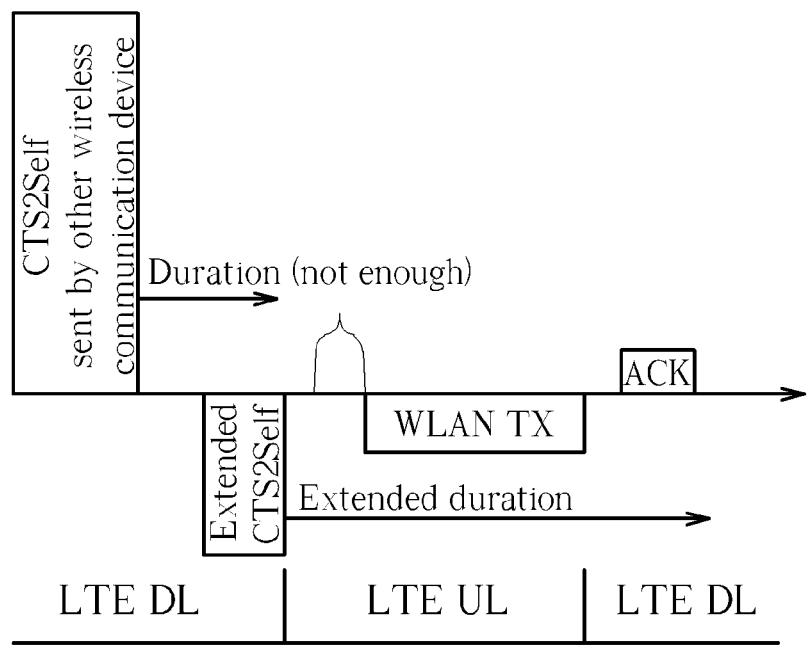
Figure 6C:
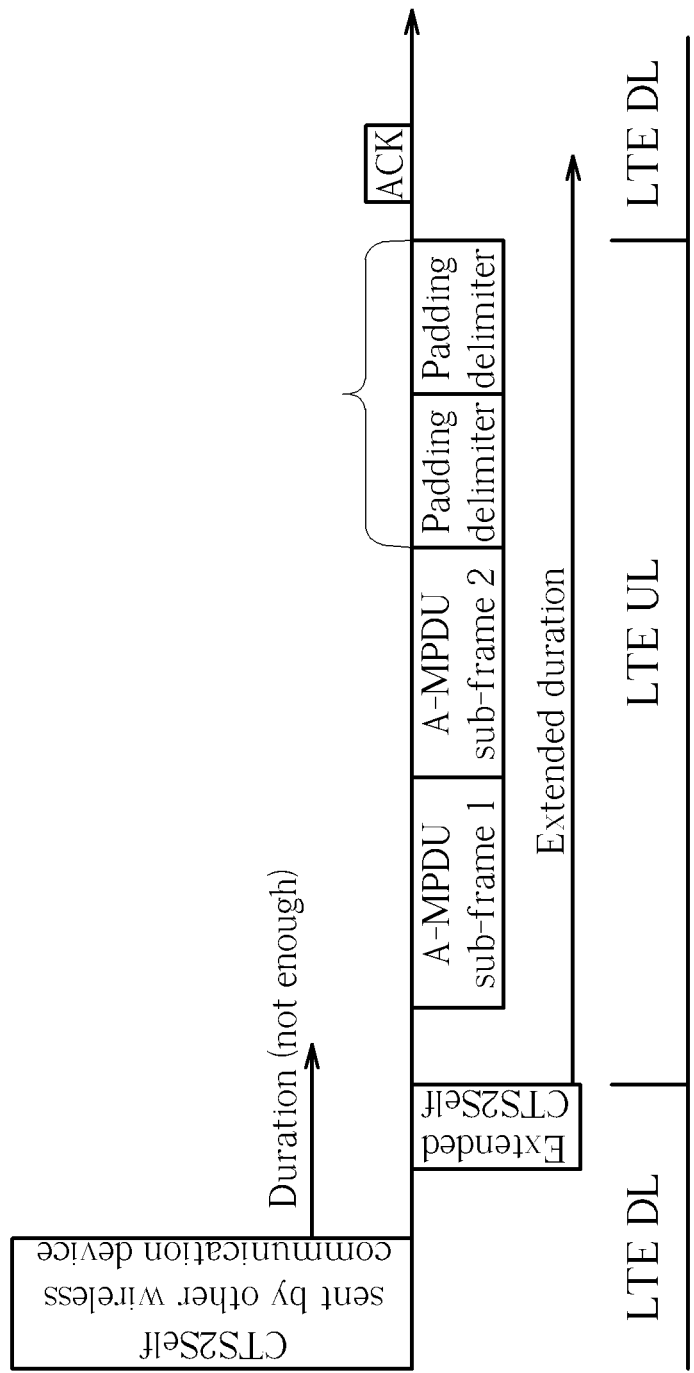

Furthermore, in order to adjust a reception period of the ACK signal falling into the LTE downloading cycle, the transmitter of the LTE module may adjust a transmission period or its data transmission rate. As shown in FIG. 6A, while operating in the LTE downloading cycle and the data transmission rate is fixed, the transmitter of the LTE module may adaptively defer a back-off period before initiating data transmission. Alternatively, if the back-off period is fixed in the LTE downloading cycle, the transmitter of the LTE module may adaptively adjust its data transmission rate, as shown in FIG. 6B, to extend the termination of the transmission period. In addition, if there is the Block acknowledgement (BA) agreement and an ending of a transmission packet cannot be completed at a finishing period of the LTE uploading cycle, at least one padding delimiter, such as a null delimiter, may be adaptively appended to the transmission packet, as shown in FIG. 6C, to extend the transmission period in the LTE uploading cycle.

Figure 7A:
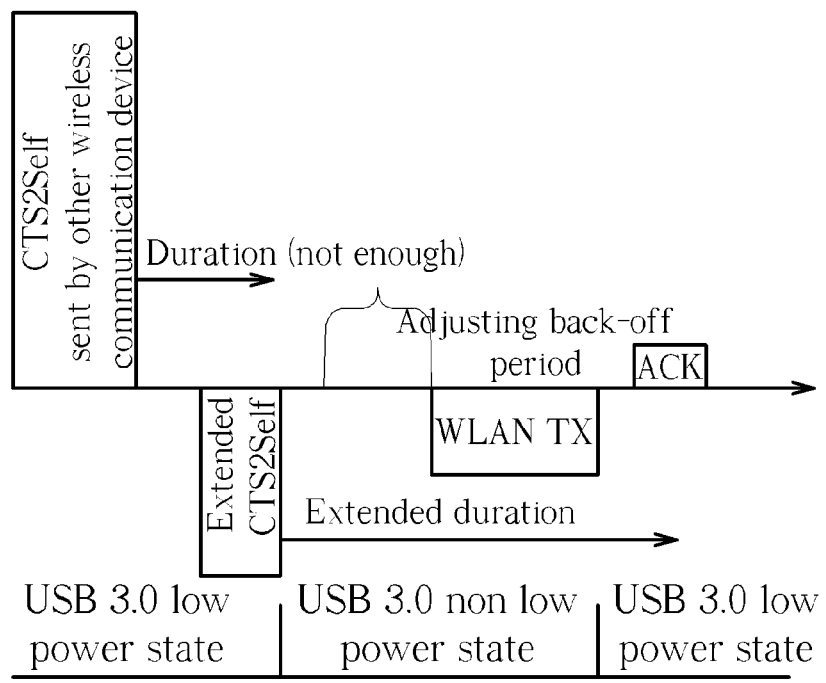
Figure 7B:
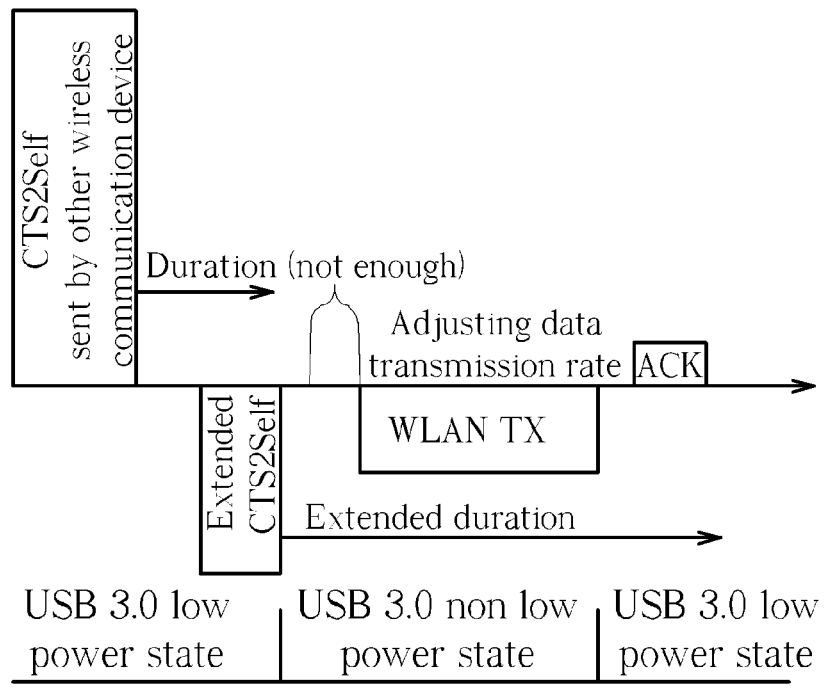
Figure 7C:
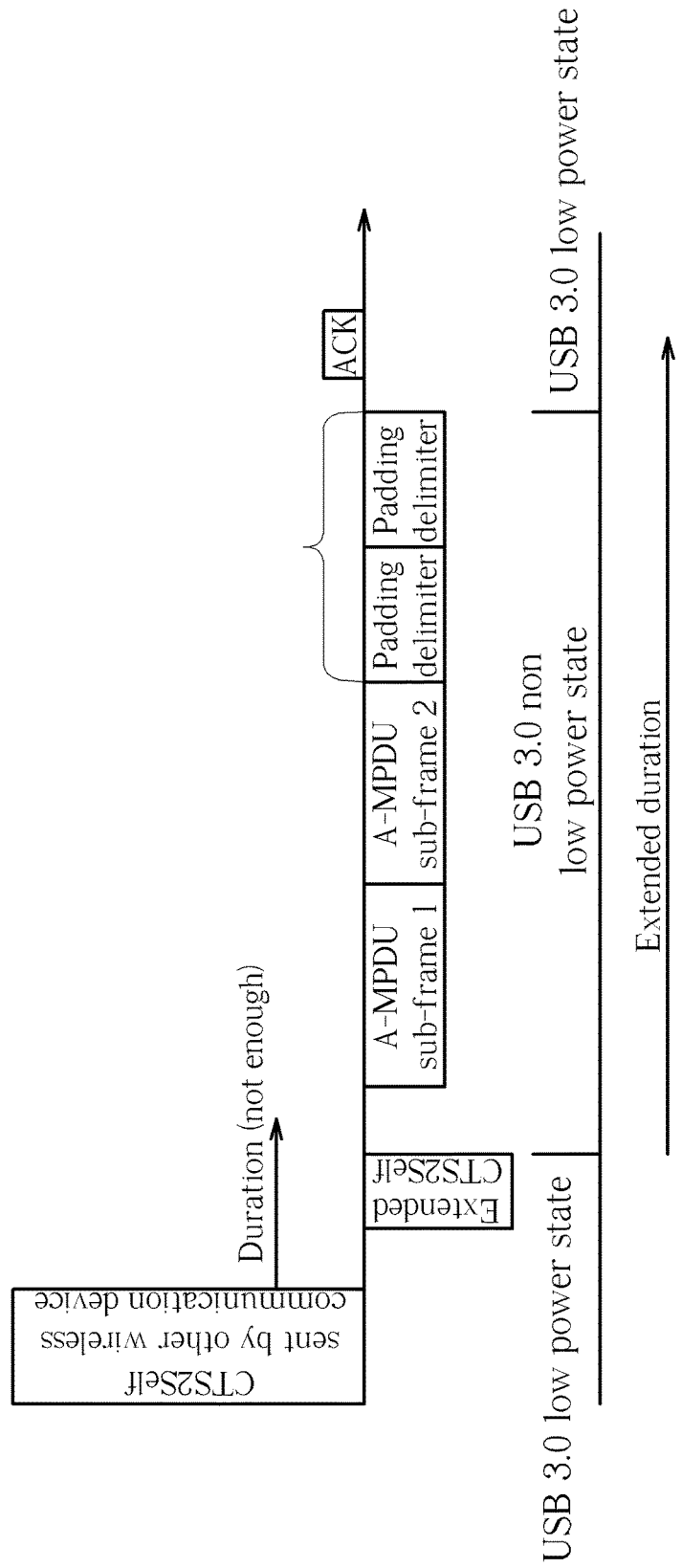

Moreover, if the first wireless communication device 100 has the WLAN module and another USB 3.0 module for data transmission, few similar operations may also be adopted to extend the transmission period, e.g. a USB 3.0 non-low-power state, such that the reception period of the ACK signal can fall into a USB 3.0 low-power state. As shown in FIG. 7A, if the data transmission rate is fixed, the first wireless communication device 100 may adaptively defer the back-off period of the WLAN traffic while operating in the USB 3.0 non-low-power state. Alternatively, if the back-off period is fixed, the first wireless communication device 100 may adaptively adjust its data transmission rate, as shown in FIG. 7B, to extend the termination of the WLAN traffic. Additionally, if there is the BA agreement and the ending of the transmission packet cannot be completed at a termination period of the transmission period, the transmission packet, as shown in FIG. 7C, may adaptively carry at least one padding delimiter, such as the null delimiter, to extend the transmission period in the USB 3.0 non-low-power state, so as to make the ACK signal fall into the USB 3.0 low-power state.

Certainly, the number of the padding delimiter is not limiting the scope of the invention, and those skilled in the art can adaptively modify the embodiments shown in FIG. 6A to FIG. 7C together to adaptively extend the transmission period after the medium is reserved via the extended NAV, which is also within the scope of the invention.

Noticeably, the method of period allocation for the medium can be processed to adaptively allocate the transmission period for the at least two wireless communication devices having partial overlapping radio frequencies, so as to remove the potential signal traffic collision of the prior art by the extended NAV being disposed after the original NAV. Besides, many operations can be cooperated with the wireless communication device(s) for assisting the triggering of the extended NAV, to adaptively modify/add other padding delimiter in the transmission packet, so as to exactly transmit the transmission packet at the termination of the extended NAV, such that the ACK signal can be accurately received at the receiver terminal with a recognizable signal power level, which is also within the scope of the invention.

Moreover, the embodiments of the invention utilize the CTS2Self signal to reserve the medium, and, for those skilled in the art, other types of virtual carrier sense signals or packets can also be utilized as an indicator to reserve the duration of the medium, which is also in the scope of the invention.

In summary, the embodiment of the invention provides the method of period allocation for the medium accessed by different wireless communication devices having partial overlapping radio frequencies. By checking the termination period of the current NAV triggered from one wireless communication device, an additional NAV may be further generated by the other wireless communication device to combine with the current NAV, so as to form a longer reservation period (i.e. forming the extended NAV), such that the extended NAV can be utilized to collaboratively operate in the scenario of coexistence of at least two wireless communication devices without signal traffic collision.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of period allocation for a medium in a first wireless communication device comprising at least one wireless local area network (WLAN) module, the method comprising:
   while the first wireless communication device occupies the medium, detecting a termination period of a Network Allocation Vector (NAV) of the medium; and
   the first wireless communication device extending the termination period of the NAV of the medium if the termination period of the NAV is earlier than an expected period, wherein the expected period aligns with a termination period of an occupation period of one module of the first wireless communication device other than the WLAN module in the first wireless communication device.

2. The method of claim 1, wherein the NAV of the medium is triggered by a second wireless communication device sharing the medium.

3. The method of claim 1, further comprising utilizing a Clear to Send to Self (CTS2Self) signal to extend the termination period of the NAV of the medium.

4. The method of claim 3, further comprising:
   after sending the CTS2Self signal, finishing a data transmission of the first wireless communication device before the extended termination period of the NAV of the medium; and
   receiving an acknowledgement (ACK) signal in an occupation period of a second wireless communication device.

5. The method of claim 4, further comprising:
   deferring a back-off period, adjusting a data transmission rate, or using at least one padding delimiter in Block acknowledgement (BA) agreement to adjust a reception period of the ACK signal.

6. A wireless communication system, comprising a first wireless communication device comprising at least one wireless local area network (WLAN) module, at least the first wireless communication device utilizing a medium, wherein the first wireless communication device comprises:
   a processing unit, for executing a program code; and
   a data storage unit, for storing the program code representing a method of period allocation for the medium;
   wherein the program code instructs the processing unit to execute the following steps:

while the first wireless communication device occupies the medium, detecting a termination period of a Network Allocation Vector (NAV) of the medium; and the first wireless communication device extending the termination period of the NAV of the medium if the termination period of the NAV is earlier than an expected period, wherein the expected period aligns with a termination period of an occupation period of one module of the first wireless communication device other than the WLAN module in the first wireless communication device.

7. The wireless communication system of claim 6, wherein the NAV of the medium is triggered by a second wireless communication device sharing the medium.

8. The wireless communication system of claim 6, wherein the program code further instructs the processing unit to execute the following step:

utilizing a Clear to Send to Self (CTS2Self) signal to extend the termination period of the NAV of the medium.

9. The wireless communication system of claim 8, wherein the program code further instructs the processing unit to execute the following steps:

after sending the CTS2Self signal, finishing a data transmission of the first wireless communication device before the extended termination period of the NAV of the medium; and receiving an acknowledgement (ACK) signal in an occupation period of a second wireless communication device.

10. The wireless communication system of claim 9, wherein the program code further instructs the processing unit to execute the following steps:

deferring a back-off period, adjusting a data transmission rate, or using at least one padding delimiter in Block acknowledgement (BA) agreement to adjust a reception period of the ACK signal.

* * * * *